US007722742B2

(12) United States Patent
Rouhling

(10) Patent No.: US 7,722,742 B2
(45) Date of Patent: May 25, 2010

(54) CORRUGATOR BELT

(75) Inventor: Jean Alphonse Marie Rouhling, Vouthon (FR)

(73) Assignee: Voith Patent GmbH, Heidenheim (DE)

( * ) Notice: Subject to any disclaimer, the term of this patent is extended or adjusted under 35 U.S.C. 154(b) by 563 days.

(21) Appl. No.: 11/567,586

(22) Filed: Dec. 6, 2006

(65) Prior Publication Data

US 2008/0135199 A1 Jun. 12, 2008

(51) Int. Cl.

| | |
|---|---|
| ***B32B 3/02*** | (2006.01) |
| ***B32B 27/04*** | (2006.01) |
| ***B32B 27/30*** | (2006.01) |
| ***B05D 5/08*** | (2006.01) |
| ***D21F 1/10*** | (2006.01) |
| ***D21F 7/08*** | (2006.01) |

(52) U.S. Cl. ......................... 162/348; 442/97; 442/148; 428/194; 162/358.2; 162/900; 162/902; 162/903; 156/462; 427/285; 106/626

(58) Field of Classification Search ................ 162/116, 162/348, 358.1, 358.2, 361, 362, 306, 358.4, 162/900–904, 296; 156/462; 427/284, 285; 428/192–194, 196, 195.1, 157; 442/97, 98, 442/148; 474/268; 106/163.01, 165.01, 106/618, 626

See application file for complete search history.

(56) References Cited

U.S. PATENT DOCUMENTS 3,002,850 A * 10/1961 Fischer ........................ 442/75
5,422,166 A * 6/1995 Fleischer .................... 428/193
5,456,783 A 10/1995 Sissons
5,785,621 A 7/1998 Birzele
6,248,456 B1 * 6/2001 Yamane et al. .............. 428/626
6,276,420 B1 8/2001 Lanthier
2004/0126544 A1 7/2004 Jaglowski et al.
2005/0194088 A1 9/2005 Kohler

FOREIGN PATENT DOCUMENTS

| | | |
|---|---|---|
| EP | 0726982 | 8/1996 |
| EP | 0 623 459 | 8/1997 |
| EP | 0950508 | 10/1999 |
| JP | 8-151536 | * 6/1996 |
| WO | 2004/061207 | 7/2004 |

* cited by examiner

*Primary Examiner*—Eric Hug
(74) *Attorney, Agent, or Firm*—Greenblum & Bernstein, P.L.C.

(57) ABSTRACT

The present invention relates generally to fabrics used in papermaking, and relates more specifically to fabrics employed in making corrugated board. The invention also relates to a belt for a corrugated board machine, where the belt includes a coating including an anti-friction modifier which can provide one or more of the following advantages: easy application of the coating to the appropriate area of the fabric, the coating is cost effective, the coating provides for increased belt life on the machine, and increased production quality of corrugated board. The present invention also relates to corrugated board machine including a belt which has a coating containing an anti-friction modifier. The present invention also relates to a method of making a coating for a belt, and a method of applying the coating to a belt where the coating includes an anti-friction modifier.

27 Claims, 2 Drawing Sheets

CORRUGATOR BELT

BACKGROUND OF THE INVENTION

1. Field of the Invention

The present invention relates generally to fabrics used in papermaking, and relates more specifically to fabrics employed in making corrugated board. The invention also relates to a belt for a corrugated board machine, where the belt includes a coating including an anti-friction modifier which can provide one or more of the following advantages: easy application of the coating to the appropriate area of the fabric, the coating is cost effective, the coating provides for increased belt life on the machine, and increased production quality of corrugated board. The present invention also relates to corrugated board machine including a belt which has a coating containing an anti-friction modifier. The present invention also relates to a method of making a coating for a belt, and a method of applying the coating to a belt where the coating includes an anti-friction modifier.

2. Discussion of Background Information

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation. It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Contemporary fabrics are produced in a wide variety of styles designed to meet the requirements of the paper machines on which they are installed for the paper grades being manufactured. Generally, they comprise a woven or other type base fabric. Additionally, as in the case of fabrics used in the press section, the press fabrics have one or more base fabrics into which has been needled a batt of fine, non-woven fibrous material. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing at least one base fabric within the endless loop formed by another, and by needling a staple fiber batt through these base fabrics to join them to one another as in the case of press fabrics. One or more of these woven base fabrics may be of the on-machine-seamable type. This is now a well known laminated press fabric with a multiple base support structure.

In any event, the fabrics are in the form of endless loops, or are seamable into such forms, having a specific length, measured longitudinally therearound, and a specific width, measured transversely thereacross.

Reference is now made more specifically to industrial fabrics used in the manufacture of corrugated paper board, or box board, on corrugator machines. Such an industrial fabric is used to form corrugator belts. On corrugator machines, corrugator belts support and pull a sheet of liner board and a sheet of paper board which pass over a roll which adds flutes or CD corrugations to the paperboard sheet. Then these at least two paperboard sheets supported by one or more belts are passed first through a heating zone, where an adhesive used to bond the at least two layers of the board together is dried and cured, and then through a cooling zone. Frictional forces between the corrugator belt, specifically the face, or board, side thereof, and the corrugated paper board are primarily responsible for pulling the latter through the machine.

Corrugator belts should be strong and durable, and should have good dimensional stability under the conditions of tension and high temperature encountered on the machine. The belts must also be comparatively flexible in the longitudinal, or machine, direction, while having sufficient rigidity in the cross-machine direction to enable them to be guided around their endless paths. Traditionally, it has also been desirable for the belts to have porosities sufficient to permit vapor to pass freely therethrough, while being sufficiently incompatible with moisture to avoid the adsorption of condensed vapor which might rewet the surfaces of the corrugated paper product.

As implied in the preceding paragraph, a corrugator belt takes the form of an endless loop when installed on a corrugator machine. In such form, the corrugator belt has a face, or boardside, which is the outside of the endless loop, and a backside, which is the inside of the endless loop. Frictional forces between the backside and the drive rolls of the corrugator machine move the corrugator belt, while frictional forces between the faceside and the sheet of corrugated board pull the sheet through the machine.

Corrugator belts are generally flat-woven, multi-layered fabrics, each of which is woven to size or trimmed in the lengthwise and widthwise directions to a length and width appropriate for the corrugator machine on which it is to be installed. The ends of the fabrics are provided with seaming means, so that they may be joined to one another with a pin, pintle, or cable when the corrugator belt is being installed on a corrugator machine.

In a typical corrugator machine, the heating zone comprises a series of hot plates across which the sheet of corrugated board is pulled by the corrugator belt. A plurality of weighted rollers within the endless loop formed by the corrugator belt press the corrugator belt toward the hot plates, so that the corrugator belt may pull the sheet across the hot plates under a selected amount of pressure. The weighted rollers ensure that the sheet will be firmly pressed against the hot plates, and that frictional forces between the corrugator belt and the sheet will be sufficiently large to enable the belt to pull the sheet.

However, corrugator belts currently available typically show preferential wear in the vicinity of the edges. This wear makes the belts unacceptable to manufacture a sheet of corrugated board of even quality across the boards width. In addition, because of wear in the vicinity of the edges of the corrugator belts, service life of the corrugator belts is greatly reduced.

In an attempt to solve premature wear problems associated with corrugator belts, U.S. Pat. No. 5,785,621 to BIRZELE, the disclosure of which is hereby expressly incorporated by reference in its entirety, discloses adding more wear resistant and/or more temperature resistant warp threads adjacent to the longitudinal edge of the belt. BIRZELE, however, utilizes the more wear resistant and/or more temperature resistant warp threads such that provides a belt which is complicated and expensive to manufacture.

U.S. Pat. Pub. No. 2004/0126544 to JAGLOWSKI, the disclosure of which is hereby expressly incorporated by reference in its entirety, discloses a fabric coated only on the high spots with a silicone material. JAGLOWSKI, however, utilizes the silicone material across the entire width of the fabric, which may allow migration of the coating material to the inside of the product, modifying its compressibility, and could result in running irregularities. Furthermore, the silicone material applied to the fabric in JAGLOWSKI increases the coefficient of friction of the corrugator fabric. That is, the increased coefficient of friction can lead to increased wear of the fabric.

U.S. Pat. No. 6,276,420 to LANTHIER, the disclosure of which is hereby expressly incorporated by reference in its entirety, discloses the use of a coated fabric to resist wear and more effectively allow corrugated board to pass through the machine. LANTHIER, however, utilizes the coating across substantially the whole width of the board. That is, the coating may affect the fabric runnability and productivity.

SUMMARY OF THE INVENTION

The corrugator belt disclosed herein addresses these needs explained above.

The present invention relates to a belt, where the belt includes: a central woven base, and at least one layer of a coating on at least one side of the woven base in the vicinity of the edges of the woven base in a wearing area, wherein the coating comprises the reaction product of: an acrylic resin in a water dispersion, a hydrated methylcellulose, water, and an anti-friction modifier.

The anti-friction modifier in the coating preferably includes at least one of graphite, molybdenum, molybdenum disulfide, PTFE, mica, and talc.

The coating preferably includes at least two layers, wherein each layer can contain a different anti-friction modifier.

The coating preferably includes the reaction product of: about 25% to about 55% by weight of an acrylic resin in a water dispersion; about 10% to about 30% by weight of a hydrated methylcellulose; about 10% to about 40% by weight water, and about 0.5% to about 15% by weight of an anti-friction modifier.

The belt is at least one of a woven belt or needled belt. When the belt is a needled belt, it preferably contains on at least one side a fiber batt needled on the woven base.

The present invention relates to a cardboard machine including: a belt comprising a central woven base, and at least one layer of a coating on at least one side of the woven base in the vicinity of the edges of the woven base in a wearing area, wherein the coating comprises the reaction product of: an acrylic resin in a water dispersion, a hydrated methylcellulose, water, and an anti-friction modifier.

The corrugated cardboard machine can also include a plurality of contact shoes in contact with a surface of the belt.

The anti-friction modifier in the coating preferably includes at least one of graphite, molybdenum, molybdenum disulfide, PTFE, mica, and talc.

The coating preferably includes at least two layers, wherein each layer can contain a different anti-friction modifier.

The coating preferably includes the reaction product of: about 25% to about 55% by weight of an acrylic resin in a water dispersion; about 10% to about 30% by weight of a hydrated methylcellulose; about 10% to about 40% by weight water, and about 0.5% to about 15% by weight of an anti-friction modifier.

The belt is at least one of a woven belt or needled belt. When the belt is a needled belt, it preferably contains on at least one side a fiber batt needled on the woven base.

The present invention relates to a method of applying a coating on a belt, the method including: providing a belt comprising a woven base, applying at least one layer of a coating on at least one side of the woven base in the vicinity of the edges of the woven base in a wearing area, wherein the coating comprises the reaction product of: an acrylic resin in a water dispersion, a hydrated methylcellulose, water, and an anti-friction modifier, and drying the applied coating.

The method of applying the coating of the present invention preferably provides an anti-friction modifier in the coating including at least one of graphite, molybdenum, molybdenum disulfide, PTFE, mica, and talc.

The method of applying the coating of the present invention, preferably includes a coating where the coating is applied as at least two layers, wherein each layer may contain a different anti-friction modifier.

The method of applying the coating of the present invention preferably provides a coating including the reaction product of: about 25% to about 55% by weight of an acrylic resin in a water dispersion; about 10% to about 30% by weight of a hydrated methylcellulose; about 10% to about 40% by weight water, and about 0.5% to about 15% by weight of an anti-friction modifier.

The method of applying the coating of the present invention preferably includes a belt which is at least one of a woven belt or needled belt.

The method of applying the coating of the present invention preferably provides a woven belt which contains on at least one side a fiber batt needled on the woven base.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of preferred embodiments of the present invention, in which like numerals represent like elements throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Preliminarily, it is noted that while the discussion of the present invention refers to corrugator fabrics, it has applicability to other fabrics in the papermaking industry and other industrial applications. Additional applications include industrial corrugated fabrics. Fabric constructions include woven, spiral wound, knitted, extruded mesh, spiral-link, spiral coil and other nonwoven fabrics. These fabrics may comprise monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the industrial fabric arts.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

Figure 1:
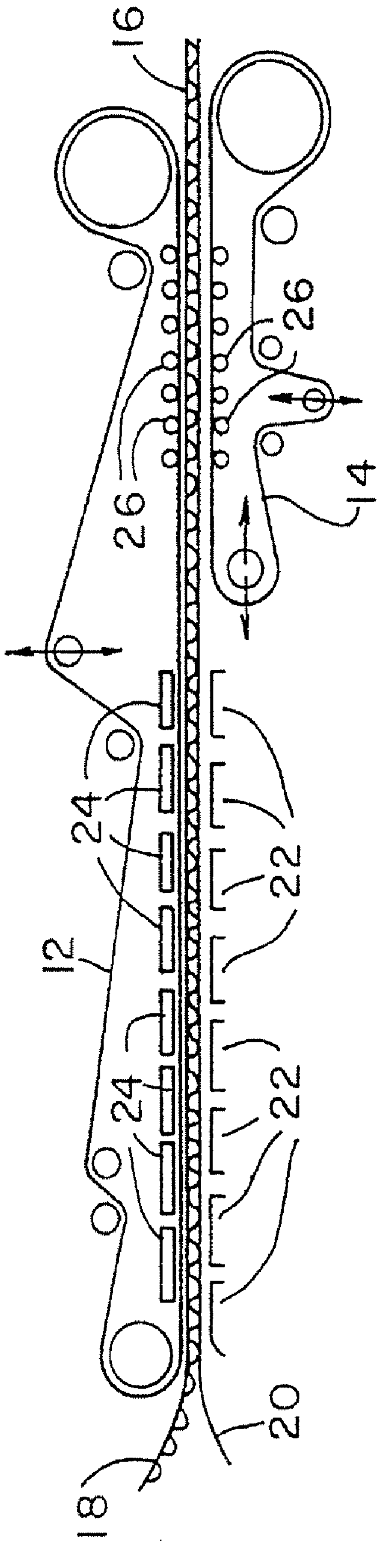
FIG. 1 Prior Art
FIG. 1 is a schematic view of a conventional corrugated cardboard machine.

Referring to the drawings wherein like numerals represent like elements, FIG. 1 represents a conventional corrugator machine 10 which can have an upper corrugator belt 12 and a lower corrugator belt 14 which together pull a corrugated paper product 16 therethrough. The corrugated paper product 16 can include a corrugated layer 18 and an uncorrugated layer 20, which are to be joined to one another in the corrugator machine 10 by means of a suitable adhesive. The corrugated layer 18 and the uncorrugated layer 20 are brought together at one end of the machine 10 and are pulled by the upper corrugator belt 12 across a series of hot plates 22 to dry and/or to cure the adhesive which bonds the paper layers together.

The corrugator machine 10 can include a plurality of air bearings 24 from which high-velocity air flows are directed against the inside of the upper corrugator belt 12 toward the hot plates 22. The air bearings 24 thereby apply pressure from within the endless loop formed by upper corrugator belt 12, so that the upper corrugator belt 12 may pull the corrugated paper product 16 across the series of hot plates 22 at the same time as it pushes the corrugated paper product 16 against the series of hot plates 22. It should be understood by the reader that the upper corrugator belt 12, the corrugated paper product 16 and the series of hot plates 22 are separated from one another for the sake of clarity in FIG. 1.

The corrugator machine 10, can include a plurality of metal plates pressing directly against the side of the upper corrugator belt 12 toward the hot plates 22. The plurality of metal plates provide a series of contact assemblies associated with the back side of corrugator belt 12. For example, air bearings 24 or weighted rollers 26 can act as the plurality of metal plates, or the metal plates can be actuated by a means other than air or weight, for example, by mechanical or hydraulic actuation. Thus, the contact assemblies associated with the back side of corrugator belt 12 can include a plurality of contact shoes which can extend laterally across the corrugator belt 12, wherein each of the contact shoes has a contact surface for slidably contacting the back side of the corrugator belt 12.

As noted above, because corrugator machine 10 includes air bearings 24, upper corrugator belt 12 has a layer of polymeric resin material on its inner surface, that is, on the inner surface of the endless loop formed thereby on the corrugator machine. The layer of polymeric resin material renders the upper corrugator belt 12 impermeable, so that the flow of air from air bearings 24 cannot pass therethrough. Alternatively, weighted rollers may be used in combination with or in place of air bearings 24. In such a case, if air bearings 24 are used, it is preferable to use a layer of polymeric resin on the corrugator belt 12 on its inner surface so as to make it substantially impermeable to air. Therefore, in certain situations, it may be desirable to have a corrugator belt which is permeable to air.

In any case, after passing over the series of hot plates 22, the upper corrugator belt 12 and the lower corrugated belt 14 together pull the corrugated paper product 16 between them, maintaining the speed of the process operation and cooling the corrugated paper product 16. As may be observed, weighted rollers 26 may be deployed to apply pressure from within the endless loops formed by the upper corrugator belt 12 and the lower corrugator belt 14 toward one another, so that the corrugated paper product 16 may be held therebetween with some suitable degree of firmness. Air bearings may be used in combination with or instead of the weighted rollers 26 within upper corrugator belt 12, and if air bearings are used, the upper corrugator belt 12 preferably has a layer of polymeric resin material on the inner surface of the endless loop formed thereby on the corrugator machine to make it substantially impermeable to the air flow. However, as noted above, in certain situations, it may be desirable to have a corrugator belt which is permeable to air.

Figure 2:
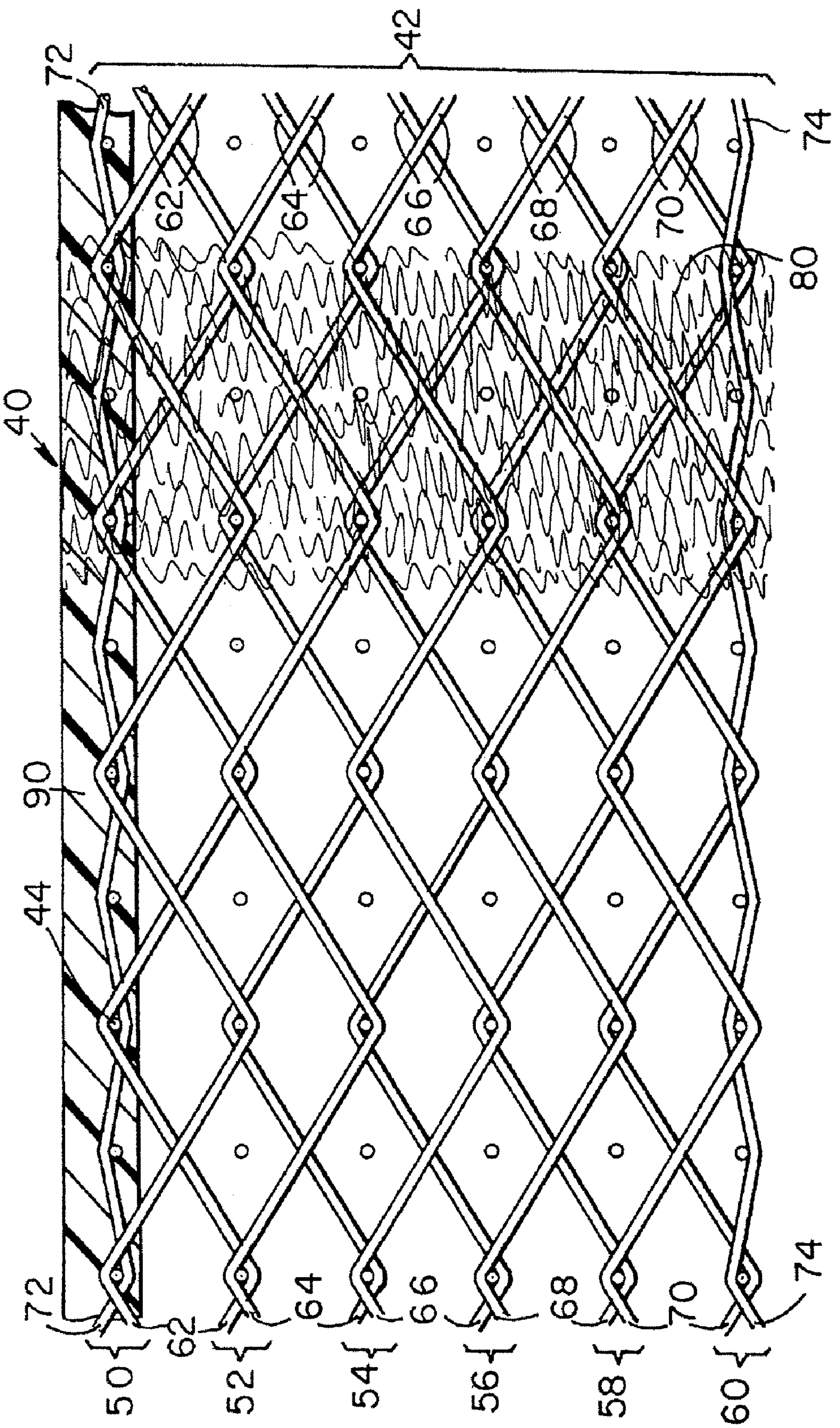
FIG. 2 is a cross-sectional view, taken in the longitudinal or warpwise direction, of a preferred embodiment of the corrugator belt of the present invention.

FIG. 2 represents cross-sectional view of a preferred embodiment of a corrugator belt of the present invention. The cross-sectional view has been taken in the longitudinal or warpwise direction in the vicinity of the edge of the corrugator belt, and shows the weft or filling yarns 44, in cross section wherein the weft or filling yarns are in a cross machine direction (CMD). Because the embodiment shown is flat-woven, the warp yarns in its base fabric are oriented in the machine direction (M) with respect to the corrugator machine on which it is installed.

As depicted in FIG. 2, the corrugator belt 40 includes a multi-layer base fabric 42 comprising a plurality of layers of weft or filling yarns, each of which layers is connected to those adjacent thereto by a system of warp yarns.

With specific reference to the embodiment illustrated in FIG. 2, the multi-layer base fabric 42 comprises six layers of weft, or filling, yarns 44, wherein the weft, or filling, yarns 44 in each layer are disposed in a vertically stacked relationship with respect to those in other layers. Although FIG. 2 depicts weft, or filling yarns 44 in a vertically stacked relationship, any relationship of weft, or filling yarns 44 is contemplated by the present invention. For example, weft, or filling yarns 44 may be in an offset relationship, where each layer of weft, or filling yarns is offset vertically from the next layer.

In addition, although FIG. 2 depicts an embodiment with six layers, any number of layers is contemplated by the present invention. Thus, one having ordinary skill in the art would readily know how to modify the number of layers in view of any number of parameters, such as belt length, weight requirements, air flow requirements, and type of board, among other things.

The first layer 50 and the second layer 52 of weft yarns 44 are joined or woven to each other by a first system of warp yarns 62. In like manner, the second layer 52 and the third layer 54 are woven together by a second system of warp yarns 64; the third layer 54 and the fourth layer 56 are woven together by a third system of warp yarns 66; the fourth layer 56 and the fifth layer 58 are woven together by a fourth system of warp yarns 68; and, finally, the fifth layer 58 and the sixth layer 60 are woven together by a fifth system of warp yarns 70.

Additional warp yarns 72 weave with the weft yarns 44 of the first layer 50 in a plain weave, and, likewise, additional warp yarns 74 weave with the weft yarns 44 of the sixth layer 60, also in a plain weave, to fill out the surfaces of the base fabric 42.

The weave pattern shown in FIG. 2, however, should be understood to be an example of the multi-layer weaves which may be employed in the practice of the present invention and should not be construed as limiting such practice to the specific weave shown. In like manner, the corrugator belt of the present invention may be manufactured wherein any permutation of first layer 50, second layer 52, third layer 54, fourth layer 56, fifth layer 58, or sixth layer 60 are weaved together.

The base fabric 42 may be woven from warp and filling yarns comprising yarns of any of the varieties used in the manufacture of papermachine clothing and industrial process fabrics. That is to say, the base fabric 42 may include monofilament, plied monofilament, or multifilament yarns of any of the synthetic polymeric resins used by those skilled in the art, such as polyester, polyamide, and polyethylene or polybutylene terephthalate (PET). By way of non-limiting example, the most preferred belt material for the belt of the present invention is PET. Spun yarns of natural or synthetic staple fibers may also be included, so long as they are capable of withstanding the temperatures characteristic of corrugator machines. Spun polyester, polyamide or polyaramid yarns are but a few examples.

One or both sides of the base fabric 42 may be needled with a web 80 of staple fiber material in such a manner that the fibers are driven into the structure of the base fabric 42. One or more layers of staple fiber material may be needled into one or both sides of the base fabric 42, and the web 80 may extend partially or completely through the base fabric 42.

The webs of staple fiber material used for this purpose may be of polyester, polypropylene, polyamide or acrylic fibers. For the sake of clarity, the web 80 is included in only a portion of FIG. 2.

Where a spiral coil carrier of the variety described above is used instead of base fabric 42, one or both of its two sides may be needled with a web of staple fiber material in such a manner that the fibers are driven into its structure. One or more layers of staple fiber material may be needled into one or both sides of the spiral coil carrier, and the web may extend partially or completely through the spiral coil carrier.

Referring again to FIG. 2, base fabric 42 is coated with a coating 90. In actual use on a corrugator machine, when the corrugator belt 40 has been placed thereon in the form of an endless loop, the coating 90 can be disposed on the cardboard side (outside) of the endless loop of belt 40. Although not depicted in FIG. 2, the coating 90 can also be applied to the drive side (inside) of the endless-loop. It should be noted that in some embodiments, the coating is applied in the vicinity of the edge of the corrugator belt, however the present invention contemplates applying the coating anywhere on the corrugator belt where preferential wear may take place, such as by contact with box board, or the drive mechanism of the corrugated cardboard machine, or both.

By way of non-limiting example, the coating is applied in at least one layer, and preferably at least two layers so as to provide even distribution of the coating on the corrugator belt. By way of non-limiting example, the coating is applied by painting or spraying. In some embodiments, the coating can be applied using rollers. In some embodiments, the coating is applied in at least one pass, and preferably in at least two passes. By way of non-limiting example, the first pass applies the coating which penetrates the face of the belt approximately 0.5 mm to approximately 4 mm deep, preferably approximately 1.0 to approximately 2.5 mm deep, and most preferably approximately 0.9 to approximately 1.5 mm deep. Further by way of non-limiting example, a second pass makes the surface of the coating 90 even, without overthickness as compared to a first pass, and the coating penetrates the face of the belt approximately 0.5 mm deep to approximately 4 mm deep, preferably approximately 1.0 mm deep to approximately 2.5 mm deep, and most preferably 0.9 mm deep to approximately 1.5 mm deep.

Similarly, where a spiral coil carrier is used instead of a base fabric 42, at least one of its two sides, and preferably the cardboard side (outside) is coated with a layer of the coating 90. Thus, in the actual use of such a corrugator belt on a corrugator machine, the layer of coating material is disposed on the outside of the endless-loop form thereof.

In some embodiments, the coating 90 decreases the coefficient of friction of the surface of the corrugator belt 40, relative to either the drive mechanisms, and/or the corrugated board, to a value in the range from approximately 0.18 to approximately 0.11, enabling the belt to provide a low friction surface which increases wear resistance of the corrugator belt 40.

The coating composition used to provide coating 90 preferably includes at least an acrylic resin dispersed in water, hydrated methylcellulose, water, and an anti-friction modifier.

The acrylic resin in the coating composition of the present invention can be any acrylic resin which provides suitable resistance to abrasion, especially at elevated temperatures up to approximately 200° C. However, it is noted that hard resins after reticulation typically have a better resistance to abrasion. But, it is desired to impart some elasticity to the resin to avoid too much cracking of the surface. Therefore, for at least these reasons, a preferred acrylic resin in the coating composition of the present invention include the resins APPRETAN N9213 in the Clariant range of products (e.g., APPRETAN N 9210/9211/9212/9213).

By way of non-limiting example, the acrylic resin in the coating composition of the present invention can be in a range of approximately 25 wt. % to approximately 55 wt. %, preferably in a range of approximately 45 wt. % to approximately 55 wt. %, and most preferably in a range of approximately 48 wt. % to approximately 52 wt. %.

The hydrated methylcellulose in the coating composition of the present invention can be any polymer of hydrated methylcellulose, provided the coating composition has sufficient viscosity for coating the belt. By way of non-limiting example, the preferred methylcellulose in the coating composition of the present invention includes METHOCEL® (a product of Dow Chemical Company), because it provides sufficient viscosity for coating on a belt. However, other methylcellulose products can be substituted, or combined with METHOCEL®, such as for example, APPRETAN 3308 LIQ or PRINTOGENE RM LIQ (both products of CLARIANT).

By way of non-limiting example, the hydrated methylcellulose in the coating composition of the present invention can be in a range of approximately 10 wt. % to approximately 30 wt. %, preferably in a range of approximately 15 wt. % to approximately 25 wt. %, and most preferably in a range of approximately 18 wt. % to approximately 22 wt. %.

By way of non-limiting example, anti-friction modifiers capable of being used in the coating composition of the present invention are graphite, molybdenum, molybdenum disulfide, polytetrafluoroethylene (PTFE), mica, and talc.

By way of non-limiting example, the anti-friction modifier in the coating composition of the present invention can be in a range of approximately 0.5 wt. % to approximately 15 wt. %, preferably in a range of approximately 2 wt. % to approximately 10 wt. %, and most preferably in a range of approximately 4 wt. % to approximately 6 wt. %.

It should be noted that the anti-friction modifier in the coating composition of the present invention is provided in the coating in an amount which lowers the coefficient of friction of the coating as compared to the corrugator belt itself, or the coating without an anti-friction modifier. Therefore, the coating of the present invention contemplates any anti-friction modifier so long as the resultant coating has a lower coefficient of friction as compared to the corrugator belt itself, or the coating without an anti-friction modifier. In addition, it is preferred to use an anti-friction modifier which is not removed from the surface of the belt during use so as not to pollute the surfaces of the board, and/or machine areas which contact the belt.

By way of non-limiting example, the anti-friction modifier graphite in the coating composition of the present invention can be in a range of approximately 0.5 wt. % to approximately 15 wt. %, preferably in a range of approximately 2 wt. % to approximately 10 wt. %, and most preferably in a range of approximately 4 wt. % to approximately 6 wt. %.

By way of non-limiting example, the graphite can be any graphite which is not removed from the surface of the belt during use so as not to pollute the surfaces of the board, and/or machine areas which contact the belt. By way of non-limiting example, it is preferred to use very fine/thin powder of graphite, a form which is commonly used in the laboratory setting. By way of non-limiting example, PROLABO 24489 graphite (a product of VWR International) can be used. By way of another non-limiting example, quality MERCK 1.04206 can also be used as the graphite for the anti-friction modifier in the coating composition of the present invention.

By way of non-limiting example, the anti-friction modifier molybdenum compound in the coating composition of the present invention can be in a range of approximately 0.5 wt. % to approximately 15 wt. %, preferably in a range of approximately 2 wt. % to approximately 10 wt. %, and most preferably in a range of approximately 4 wt. % to approximately 6 wt. %.

By way of non-limiting example, the molybdenum compound can be molybdenum powder or molybdenum disulfide. By way of non-limiting example, the molybdenum powder can be Molybdenum Metal Powder, a product from H.C. Starck. By way of non-limiting example, the molybdenum disulfide can be MOLYFORM®, a product from H.C. Starck.

By way of non-limiting example, the anti-friction modifier polytetrafluoroethylene (PTFE) in the coating composition of the present invention can be in a range of approximately 0.5 wt. % to approximately 15 wt. %, preferably in a range of approximately 2 wt. % to approximately 10 wt. %, and most preferably in a range of approximately 4 wt. % to approximately 6 wt. %.

By way of non-limiting example, the polytetrafluoroethylene (PTFE) can be TEFLON® FEP Powder or Dispersion (a product of DuPont de Nemours).

By way of non-limiting example, the anti-friction modifier mica in the coating composition of the present invention can be in a range of approximately 0.5 wt. % to approximately 15 wt. %, preferably in a range of approximately 2 wt. % to approximately 10 wt. %, and most preferably in a range of approximately 4 wt. % to approximately 6 wt. %.

By way of non-limiting example, the mica can be Micro-Lite® vermiculite powder or dispersion (a product of W.R. Grace).

By way of non-limiting example, the anti-friction modifier talc in the coating composition of the present invention can be in a range of approximately 0.5 wt. % to approximately 15 wt. %, preferably in a range of approximately 2 wt. % to approximately 10 wt. %, and most preferably in a range of approximately 4 wt. % to approximately 6 wt. %.

By way of non-limiting example, the talc can be quality Mistron® talc (a product of Luzenac).

The balance of the coating composition of the present invention includes water, in a range of approximately 10 wt. % to approximately 40 wt. %, preferably in a range of approximately 20 wt. % to approximately 30 wt. %, and most preferably in a range of approximately 23 wt. % to approximately 27 wt. %.

The coating composition of the present invention can also include other additives. By way of non-limiting example, the coating may also contain additional ingredients so as to modify the color, drying time, mixing efficiency, and coating viscosity of the coating composition. Such additional ingredients are well known in the art. By way of non-limiting example, examples of additives which can be included in the coating composition of the present invention include CASSURIT® MT (a product of CLARIANT) which increases the performance of the resultant coating, or CATALYSEUR® NYA (a product of CLARIANT) which allows the acceleration and improvement of reticulation.

The coating composition of the present invention is prepared by mixing the components of the coating composition. Although any order of mixing the components is contemplated by the present invention, it is preferred to mix the components in two steps. By way of non-limiting example, Steps “A” and “B” are detailed below.

By way of non-limiting example, in Step A, a mixture in the proportion 4 kgs of METHOCEL® for every 100 liters of water is prepared. It is noted that the mixture in step A should be prepared at least 48 hours before combining with the preparation of the coating composition in Step B.

By way of non-limiting example, in Step B, the coating composition of the present invention is prepared by mixing the following components in the following order:

1—APPRETAN 9213 (acrylic resin): 50 wt. %

2—METHOCEL® (as prepared as described in Step A): 20 wt. %

3—Water: 25 wt. %

Shake the solution to ensure the mixture is substantially homogenized.

4—Graphite (anti-friction modifier): 5 wt. %

Shake the solution to ensure the mixture is substantially homogenized.

After the coating composition of the present invention is prepared, as noted above, it can be applied by painting or spraying, in at least one pass, and preferably two passes to ensure adequate coverage on the belt. By way of non-limiting example, the coating speed of the belt for coating the composition of the present invention is approximately 1.5 meters per minute, but can be adjusted depending on any one or combination of the following factors: (1) the porosity of the textile to be coated, (2) the shape of the textile to be coated, (3) the viscosity of the coating composition, and (4) other parameters having an impact on the coating in order to obtain a penetration of the solution reaching up preferably 1 mm under the coated surface.

After the coating composition of the present invention is applied to the belt, it is dried, so as to polymerize the coating. By way of non-limiting example, each pass of the coating can be applied in a temperature range of approximately 20° C. to approximately 50° C., preferably approximately 35° C. to approximately 45° C. and then dried at an elevated temperature range of approximately 110° C. to approximately 150° C., approximately 135° C. to approximately 145° C. for approximately 1 to 5 minutes.

The coating composition is applied on at least one side of the woven base in the vicinity of the edges of the woven base in a wearing area. The wearing area, can include, but is not limited thereto, areas where the woven base contacts the machine, and can also include areas which exhibit preferential wear when the woven base is in use. The coating of the present invention does not only have to be applied on at least one side of the woven base in the vicinity of the edges of the woven base in a wearing area. Thus, it is contemplated that the coating of the present invention can be applied to the complete or substantially complete area of the woven base, but preferably the area in which the coating is applied is minimized so as to reduce cost and weight of the overall woven base.

EXAMPLE 1

A needled belt of approximately 9 mm thickness is composed of a central woven base having one layer, with each face is covered by a 3 mm fiber batt needled on the woven base. The woven belt is completely composed of woven yarns. A is then applied in 2 passes having the following composition:

50 wt. % acrylic resin in a water dispersion;

20 wt. % of hydrated methylcellulose;

25 wt. % water; and 5 wt. % graphite.

The first pass of the coating penetrates the face of the belt approximately 1 mm deep and is coated at a temperature of approximately 60° C., followed by drying at approximately 140° C. for approximately 2 minutes. The second pass of the coating is performed under the same temperature conditions to concentrate the coating on the surface, which makes the surface even, without having an overthickness compared to the previous surface. After these two coating passes, the coating is heated again at approximately 140° C. for approximately 4 minutes to complete the drying and ensure reticulation.

Although the above examples and descriptions provide a coating wherein each pass includes the same anti-friction modifier, the present invention contemplates using different anti-friction modifiers in each pass. Therefore, when a different anti-friction modifier is used in each pass, it will be necessary to provide at least two different coating compositions, each one containing different anti-friction modifiers. Likewise, the present invention also contemplates using different anti-friction modifiers in different areas of the belt where the coating is applied. By way of non-limiting example, the first pass could include one type of anti-friction modifier in the right side of the belt, and another on the left side of the belt. In addition, by way of a non-limiting example, each coating composition can also be formed from differing amounts of acrylic resin, hydrated methylcellulose, water, and optionally other additives.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A papermaking belt comprising:

a central woven base, and at least one layer of a coating on at least one side of the woven base in the vicinity of the edges of the woven base in a wearing area, wherein the coating comprises the reaction product of:

an acrylic resin in a water dispersion, a hydrated methylcellulose, water, and an anti-friction modifier, wherein the papermaking belt is structured and arranged for use in papermaking.

2. The belt according to claim 1, wherein the anti-friction modifier in the coating comprises at least one of graphite, molybdenum, molybdenum disulfide, PTFE, mica, and talc.

3. The belt according to claim 2, wherein the anti-friction modifier in the coating comprises graphite.

4. The belt according to claim 2, wherein the coating comprises at least two layers.

5. The belt according to claim 1, wherein the belt is at least one of a woven belt or needled belt.

6. The belt according to claim 1, wherein the papermaking belt is structured and arranged to manufacture corrugated board.

7. The belt according to claim 1, wherein the papermaking belt is structured and arranged to manufacture corrugated board on a corrugated cardboard machine.

8. A belt comprising:
a central woven base, and
at least one layer of a coating on at least one side of the woven base in the vicinity of the edges of the woven base in a wearing area,
wherein the coating comprises the reaction product of:
an acrylic resin in a water dispersion,
a hydrated methylcellulose,
water, and
an anti-friction modifier,
wherein the anti-friction modifier in the coating comprises at least one of graphite, molybdenum, molybdenum disulfide, PTFE, mica, and talc,
wherein the coating comprises at least two layers, and
wherein each layer contains a different anti-friction modifier.

9. A belt comprising:
a central woven base, and
at least one layer of a coating on at least one side of the woven base in the vicinity of the edges of the woven base in a wearing area,
wherein the coating comprises the reaction product of:
an acrylic resin in a water dispersion,
a hydrated methylcellulose,
water, and
an anti-friction modifier,
wherein the coating comprises the reaction product of:
about 25% to about 55% by weight of an acrylic resin in a water dispersion;
about 10% to about 30% by weight of a hydrated methylcellulose;
about 10% to about 40% by weight water, and
about 0.5% to about 15% by weight of an anti-friction modifier.

10. A belt comprising:
a central woven base, and
at least one layer of a coating on at least one side of the woven base in the vicinity of the edges of the woven base in a wearing area,
wherein the coating comprises the reaction product of:
an acrylic resin in a water dispersion,
a hydrated methylcellulose,
water, and
an anti-friction modifier,
wherein the belt is at least one of a woven belt or needled belt, and
wherein the needled belt contains on at least one side a fiber batt needled on the woven base.

11. A corrugated cardboard machine comprising:
a belt comprising a central woven base, and
at least one layer of a coating on at least one side of the woven base in the vicinity of the edges of the woven base in a wearing area,
wherein the coating comprises the reaction product of:
an acrylic resin in a water dispersion,
a hydrated methylcellulose,
water, and
an anti-friction modifier.

12. The corrugated cardboard machine according to claim 11, further comprising a plurality of contact shoes in contact with a surface of the belt.

13. The corrugated cardboard machine according to claim 11, wherein the anti-friction modifier in the coating comprises at least one of graphite, molybdenum, molybdenum disulfide, PTFE, mica, and talc.

14. The corrugated cardboard machine according to claim 13, wherein the anti-friction modifier in the coating comprises graphite.

15. The corrugated cardboard machine according to claim 13, wherein the coating comprises at least two layers, wherein each layer contains a different anti-friction modifier.

16. The corrugated cardboard machine according to claim 11, wherein the coating comprises the reaction product of:
about 25% to about 55% by weight of an acrylic resin in a water dispersion;
about 10% to about 30% by weight of a hydrated methylcellulose;
about 10% to about 40% by weight water, and
about 0.5% to about 15% by weight of an anti-friction modifier.

17. The corrugated cardboard machine according to claim 11, wherein the belt is at least one of a woven belt or needled belt.

18. The corrugated cardboard machine according to claim 17, wherein the needled belt contains on at least one side a fiber batt needled on the woven base.

19. A method of applying a coating on a papermaking belt, the method comprising:
providing a papermaking belt comprising a woven base,
applying at least one layer of a coating on at least one side of the woven base in the vicinity of the edges of the woven base in a wearing area,
wherein the coating comprises the reaction product of:
an acrylic resin in a water dispersion,
a hydrated methylcellulose,
water, and
an anti-friction modifier,
drying the applied coating.

20. The method of applying a coating to a woven base according to claim 19, wherein the anti-friction modifier in the coating comprises at least one of graphite, molybdenum, molybdenum disulfide, PTFE, mica, and talc.

21. The method of applying a coating on a belt according to claim 20, wherein the anti-friction modifier in the coating comprises graphite.

22. The method of applying a coating on a belt according to claim 20, wherein the coating is applied as at least two layers, wherein each layer may contain a different anti-friction modifier.

23. The method of applying a coating on a belt according to claim 19, wherein the belt is at least one of a woven belt or needled belt.

24. The method according to claim 19, further comprising manufacturing corrugated board with the papermaking belt.

25. The method according to claim 19, further comprising manufacturing, with the papermaking belt, corrugated board on a corrugated cardboard machine.

26. A method of applying a coating on a belt, the method comprising:
providing a belt comprising a woven base,
applying at least one layer of a coating on at least one side of the woven base in the vicinity of the edges of the woven base in a wearing area,
wherein the coating comprises the reaction product of:
an acrylic resin in a water dispersion,
a hydrated methylcellulose,
water, and
an anti-friction modifier; and drying the applied coating, wherein the coating comprises the reaction product of:

about 25% to about 55% by weight of an acrylic resin in a water dispersion;

about 10% to about 30% by weight of a hydrated methylcellulose;

about 10% to about 40% by weight water, and about 0.5% to about 15% by weight of an anti-friction modifier.

27. A method of applying a coating on a belt, the method comprising:

providing a belt comprising a woven base, applying at least one layer of a coating on at least one side of the woven base in the vicinity of the edges of the woven base in a wearing area, wherein the coating comprises the reaction product of:

an acrylic resin in a water dispersion, a hydrated methylcellulose, water, and an anti-friction modifier; and drying the applied coating, wherein the woven belt contains on at least one side a fiber batt needled on the woven base.

* * * * *